(12) United States Patent
Tang et al.

(10) Patent No.: US 11,486,316 B2
(45) Date of Patent: Nov. 1, 2022

(54) METHOD AND SYSTEM FOR ADJUSTING A VARIABLE GEOMETRY MECHANISM

(71) Applicant: PRATT & WHITNEY CANADA CORP., Longueuil (CA)

(72) Inventors: Poi Loon Tang, Montreal (CA); Kirsten Joan Evetts, Glastonbury, CT (US); Philippe Beauchesne-Martel, Brossard (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 490 days.

(21) Appl. No.: 16/296,470

(22) Filed: Mar. 8, 2019

(65) Prior Publication Data

US 2020/0088109 A1 Mar. 19, 2020

Related U.S. Application Data

(60) Provisional application No. 62/731,011, filed on Sep. 13, 2018.

(51) Int. Cl.
*F02C 9/22* (2006.01)
*F02C 7/042* (2006.01)

(52) U.S. Cl.
CPC ............... *F02C 9/22* (2013.01); *F02C 7/042* (2013.01); *F05D 2220/323* (2013.01); *F05D 2240/12* (2013.01); *F05D 2260/70* (2013.01)

(58) Field of Classification Search
CPC .. F02C 7/042; F02C 7/057; F02C 9/20; F02C 9/22; F05D 2220/323; F05D 2240/12; F05D 2260/70; F05D 2270/03; F05D 2270/309; F05D 2270/335; F05D 2270/44
See application file for complete search history.

(56) References Cited

U.S. PATENT DOCUMENTS

| | | | |
|---|---|---|---|
| 3,937,588 A | 2/1976 | Kisslan | |
| RE30,653 E * | 6/1981 | Schuster | F02C 9/32 60/39.281 |
| 4,279,568 A | 7/1981 | Munroe | |
| 4,594,849 A | 6/1986 | Kenison et al. | |
| 4,756,152 A | 7/1988 | Krukoski et al. | |
| 4,928,482 A | 5/1990 | Pollak et al. | |
| 4,947,643 A | 8/1990 | Pollak et al. | |

(Continued)

FOREIGN PATENT DOCUMENTS

| | | |
|---|---|---|
| CA | 3001566 | 10/2018 |
| EP | 2778376 | 9/2014 |
| JP | 11257097 | 9/1999 |

*Primary Examiner* — Jason H Duger
(74) *Attorney, Agent, or Firm* — Norton Rose Fulbright Canada LLP

(57) ABSTRACT

Systems and methods for adjusting a variable geometry mechanism of an engine are described herein. An engine control request indicative of a desired output power for the engine is monitored. A rate of change of the engine control request is determined. The rate of change is compared to a threshold. Responsive to determining that the rate of change is beyond the threshold, a transient bias map is applied to a steady-state schedule to generate a variable geometry mechanism request indicative of a target position for the variable geometry mechanism. The variable geometry mechanism is adjusted toward the target position according to the variable geometry mechanism request.

7 Claims, 8 Drawing Sheets

(56) References Cited

U.S. PATENT DOCUMENTS

| | | |
|---|---|---|
| 5,042,245 A | 8/1991 | Zickwolf, Jr. |
| 5,133,182 A | 7/1992 | Marcos |
| 5,259,188 A | 11/1993 | Baxter et al. |
| 5,315,819 A * | 5/1994 | Page .................. F02C 9/28 60/39.282 |
| 5,357,748 A | 10/1994 | Khalid |
| 6,735,955 B2 | 5/2004 | Mannarino |
| 6,758,044 B2 | 7/2004 | Mannarino |
| 6,928,817 B2 | 8/2005 | Ahmad |
| 7,096,657 B2 | 8/2006 | Mahoney et al. |
| 7,245,040 B2 | 7/2007 | Mukavetz et al. |
| 7,866,159 B2 | 1/2011 | Bowman et al. |
| 7,874,161 B2 | 1/2011 | Williams |
| 7,927,067 B2 | 4/2011 | Rajamani et al. |
| 8,079,221 B2 | 12/2011 | Bowman et al. |
| 8,272,223 B2 | 9/2012 | Nanataki et al. |
| 8,291,713 B2 | 10/2012 | Matz et al. |
| 8,302,405 B2 | 11/2012 | Price et al. |
| 8,348,600 B2 | 1/2013 | Norris et al. |
| 8,355,855 B2 | 1/2013 | Minto et al. |
| 8,403,621 B2 | 3/2013 | Guemmer |
| 8,474,268 B2 | 7/2013 | Fuller et al. |
| 8,578,717 B2 | 11/2013 | Tonno et al. |
| 8,649,954 B2 | 2/2014 | Boyer et al. |
| 8,740,548 B2 | 6/2014 | Rowe et al. |
| 8,909,454 B2 | 12/2014 | Minto |
| 9,194,301 B2 | 11/2015 | Parente |
| 9,322,341 B2 | 4/2016 | Belleville et al. |
| 9,528,385 B2 | 12/2016 | Payne |
| 9,540,944 B2 | 1/2017 | Meisner et al. |
| 9,695,752 B2 | 7/2017 | Chapman |
| 9,732,625 B2 | 8/2017 | Cai |
| 9,777,642 B2 | 10/2017 | Murrow et al. |
| 9,850,823 B2 | 12/2017 | Miduturi et al. |
| 9,938,906 B2 | 4/2018 | Oliverio |
| 10,113,487 B2 | 10/2018 | Cai et al. |
| 2004/0055310 A1 | 3/2004 | Mannarino |
| 2007/0013195 A1 | 1/2007 | Mukavetz et al. |
| 2010/0162719 A1 | 7/2010 | Bowman et al. |
| 2011/0016876 A1 | 1/2011 | Cataldi et al. |
| 2011/0142602 A1 | 6/2011 | Adhami et al. |
| 2011/0197593 A1 | 8/2011 | Fuchs et al. |
| 2012/0023953 A1 * | 2/2012 | Thomas .................. F02C 7/228 60/772 |
| 2014/0278014 A1 * | 9/2014 | Belleville ............... F02D 29/02 701/110 |
| 2016/0069277 A1 | 3/2016 | Meisner et al. |
| 2017/0002748 A1 | 1/2017 | Sonoda et al. |
| 2017/0211485 A1 * | 7/2017 | Tramontin ................ F02C 9/22 |
| 2017/0268520 A1 | 9/2017 | Moeckel et al. |

\* cited by examiner

208

302 DETERMINE A TRANSIENT BIAS VALUE FROM THE TRANSIENT BIAS MAP

304 DETERMINE A STEADY-STATE VALUE FROM THE STEADY STATE SCHEDULE

306 ADD THE TRANSIENT BIAS VALUE TO THE STEADY-STATE VALUE TO DETERMINE THE VARIABLE GEOMETRY MECHANISM REQUEST

```
┌─────────────────────────────────────────────┐
│  ADD A TRANSIENT BIAS MAP TO A STEADY-      │ 312
│  STATE SCHEDULE TO GENERATE A MODIFIED      │
│              SCHEDULE                        │
└─────────────────────────────────────────────┘
                      │
                      ▼
┌─────────────────────────────────────────────┐
│    DETERMINE THE VARIABLE GEOMETRY          │ 314
│  MECHANISM REQUEST FROM THE MODIFIED        │
│              SCHEDULE                        │
└─────────────────────────────────────────────┘
```

FIGURE 3B

METHOD AND SYSTEM FOR ADJUSTING A VARIABLE GEOMETRY MECHANISM

CROSS-REFERENCE TO RELATED APPLICATIONS

The present application claims priority under 35 U.S.C. 119(e) of Provisional Patent Application bearing Ser. No. 62/731,011 filed on Sep. 13, 2018, the contents of which are hereby incorporated by reference.

TECHNICAL FIELD

The present disclosure relates generally to engine control, and, more particularly, to adjusting a variable geometry mechanism of an engine.

BACKGROUND OF THE ART

During aircraft operations consisting of rapid engine transitions of accelerations or decelerations, it is desirable to reduce the response time of the engine required to achieve a requested power level. However, because variable inlet guide vanes are typically adjusted based on engine speed, existing solutions for adjusting variable inlet guide vanes may not be able to achieve the requested power level in a desirable amount of time.

There is therefore a need to improve methods and systems for adjusting inlet variable guide vanes.

SUMMARY

Systems and methods for adjusting a variable geometry mechanism of an engine based on rate of change or power or torque control requests, thereby effectively increasing the speed of the engine's power response, are described herein.

In one aspect, there is provided a method for adjusting a variable geometry mechanism of an engine. The method comprises: monitoring, at a computing device, an engine control request indicative of a desired output power for the engine; determining, at the computing device, a rate of change of the engine control request; comparing, at the computing device, the rate of change to a threshold; responsive to determining that the rate of change is beyond the threshold, applying, at the computing device, a transient bias map to a steady-state schedule to generate a variable geometry mechanism request indicative of a target position for the variable geometry mechanism; and adjusting a position of the variable geometry mechanism toward the target position according to the variable geometry mechanism request.

In one aspect, there is provided a system for adjusting a variable geometry mechanism of an engine. The system comprises at least one processing unit and a non-transitory computer-readable memory having stored thereon program instructions. The program instructions executable by the at least one processing unit for: monitoring an engine control request indicative of a desired output power for the engine; determining a rate of change of the engine control request; comparing the rate of change to a threshold; responsive to determining that the rate of change is beyond the threshold, applying a transient bias map to a steady-state schedule to generate a variable inlet guide vane request indicative of a target position for the variable geometry mechanism; and causing a position of the variable geometry mechanism to be adjusted toward the target position according to the variable geometry mechanism request.

DESCRIPTION OF THE DRAWINGS

Reference is now made to the accompanying figures in which:

FIG. 3A is a flowchart illustrating the step of FIG. 2 of applying a transient bias map to a steady-state schedule, in accordance with a first embodiment;

FIG. 3B is a flowchart illustrating the step of FIG. 2 of applying a transient bias map to a steady-state schedule, in accordance with a second embodiment;

It will be noted that throughout the appended drawings, like features are identified by like reference numerals.

DETAILED DESCRIPTION

Figure 1:
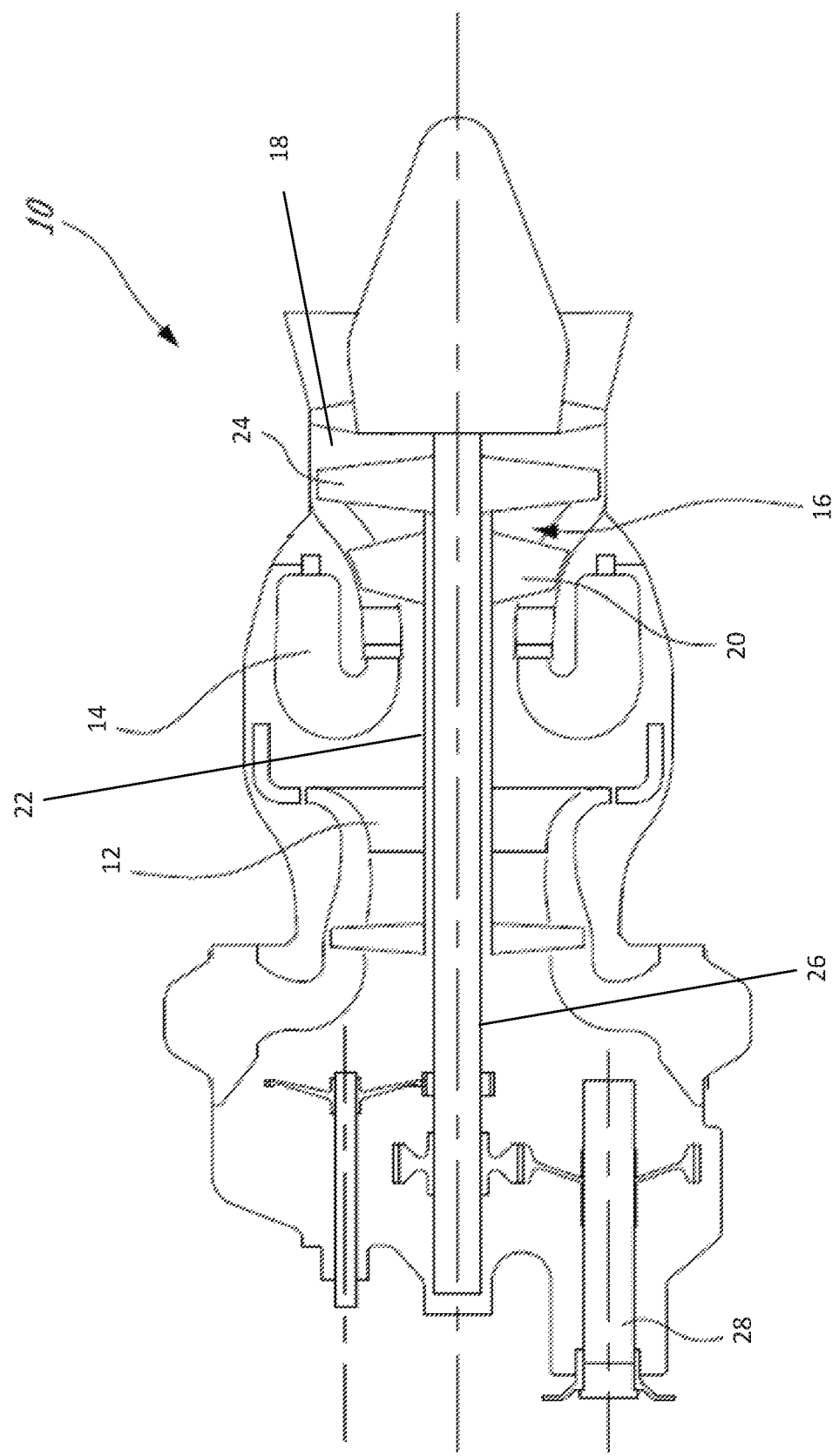
FIG. 1 is a schematic cross-sectional view of an example gas turbine engine.

FIG. 1 illustrates a gas turbine engine 10 of a type that may be provided for use in flight, generally comprising in serial flow communication a compressor section 12 for pressurizing the air, a combustor 14 in which the compressed air is mixed with fuel and ignited for generating an annular stream of hot combustion gases, and a turbine section 16 for extracting energy from the combustion gases. The combustion gases flowing out of the combustor 14 circulate through the turbine section 16 and are expelled through an exhaust duct 18. The turbine section 16 includes a compressor turbine 20 in driving engagement with the compressor section 12 through a high pressure shaft 22, and a power turbine 24 in driving engagement with a power shaft 26. The power shaft 26 is in driving engagement with an output shaft 28 through a reduction gearbox (not shown).

Although illustrated as a turboshaft engine, the gas turbine engine 10 may alternatively be another type of engine, for example a turbofan engine, also generally comprising in serial flow communication a compressor section, a combustor, and a turbine section, and a fan through which ambient air is propelled. A turboprop engine may also apply. In addition, although the engine 10 is described herein for flight applications, it should be understood that other uses, such as industrial or the like, may apply.

The engine 10 comprises a variable geometry mechanism (not illustrated in FIG. 1). In accordance with an embodiment, the variable geometry mechanism is one or more variable guide vanes (VGVs). The VGVs may be one of inlet compressor guide vanes for directing air into the compressor section 12, outlet guide vanes for directing air out of the compressor section 12, variable stator vanes for directing incoming air into rotor blades of the engine 10, variable nozzles and the like. Adjustment of the position (e.g., angle) of the VGVs can impact the inlet mass flow to the engine 10, and in turn may allow the engine 10 to operate at a requested power level. It should be appreciated that adjusting one or more of the VGVs may decrease the response time of the engine 10 during rapid engine transitions of accelerations or decelerations.

Figure 2:
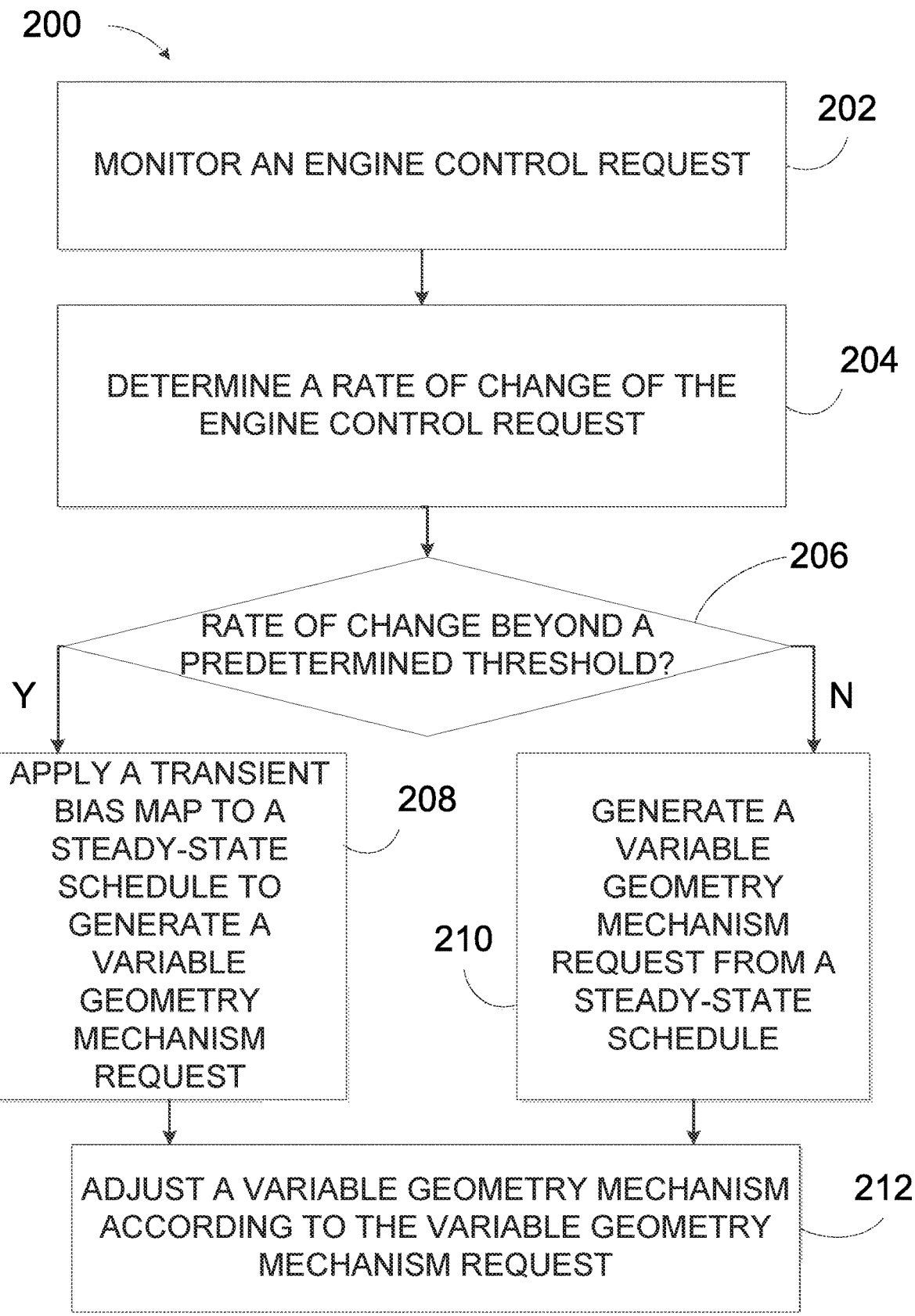
FIG. 2 is a flowchart illustrating an example method for adjusting a variable geometry mechanism of an engine, in accordance with an embodiment.

With reference to FIG. 2, there is shown a flowchart illustrating an example method 200 for adjusting a variable geometry mechanism of an engine, such as at least one variable inlet guide vane (VIGV) of the engine 10. While the method 200 is described herein with reference to the engine 10 and to VIGVs, this is for example purposes. The method 200 may be applied to any other suitable engine and/or other suitable types of variable geometry mechanisms.

At step 202, an engine control request is monitored. The engine control request is indicative of a desired output power for the engine 10. For example, the engine control request may be a power control request of the engine 10 indicative of a demand for the engine 10 to produce output power at a requested power level. By way of another example, the engine control request may be a torque control request for the engine 10 indicative of a demand for the engine 10 to produce thrust at a requested thrust level (or to produce power at a requested power level). The engine control request may be determined. The engine control request may be continuously generated, e.g. in real time, and/or may be computed regularly in accordance with any suitable time interval or irregularly. The engine control request may be received from an engine and/or aircraft computer. The engine control request may be continuously monitored, e.g. in real time, and/or may be recorded regularly in accordance with any suitable time interval or irregularly.

At step 204, a rate of change of the engine control request is determined. The rate of change may be represented as a ratio of a change of the engine control request over a corresponding period of time. For example, the rate of change may be represented as $ROC=(R_2-R_1)/(t_2-t_1)$, where $R_1$ represents the engine control request at time $t_1$ and $R_2$ represents the engine control request at time $t_2$. When the engine 10 is accelerating, the rate of change would be positive and negative when the engine 10 is decelerating. The rate of change may be continuously determined, e.g. in real time, and/or may be determined in accordance with any suitable time interval or irregularly.

At step 206, the rate of change is compared to a predetermined threshold to determine if the rate of change is beyond the threshold. In one embodiment, when the engine 10 is accelerating, the threshold may be set to have a positive value and step 206 may comprise comparing the rate of change to the positive threshold to determine if the rate of change exceeds the positive threshold. When the engine 10 is decelerating, the threshold may be set to have a negative value and step 206 may comprise comparing the rate of change to the negative threshold to determine if the rate of change is below the negative threshold. The threshold may also comprise a threshold range. For example, the threshold range may be between a negative and a positive value. Accordingly, the rate of change may be compared to the threshold range to determine if the rate of change is outside of the threshold range.

At step 208, when the rate of change is beyond the threshold, a transient bias map is applied to a steady-state schedule to generate a variable geometry request, which is indicative of a target position for the variable geometry mechanism. For example, the variable geometry request may be a variable guide vane request indicative of a target position for the at least one VIGV. In accordance with an embodiment, the transient bias map is applied to the steady-state schedule for a predetermined time period.

At step 210, when rate of change is not beyond the threshold (i.e., is within or equal to the threshold), the variable geometry mechanism request is determined from the steady-state schedule.

At step 212, a position of the variable geometry mechanism is adjusted toward the target position according to the variable geometry mechanism request. The position of the variable geometry mechanism is adjusted toward the target position until the target position is reached. However, in some cases, the position of the variable geometry mechanism may never reach the target position, for example, because of a future command to adjust the position of the variable geometry mechanism. A control signal comprising the variable geometry request may be sent to one or more actuators of the engine 10 to adjust the position of the variable geometry mechanism.

It should be appreciated that, in accordance with an embodiment, the transient bias is applied over the predetermined time period to maintain a fast engine power transition within engine operability limits and actuator bandwidth.

With additional reference to FIG. 3A, the step 208 of FIG. 2 is illustrated in accordance with a first embodiment. At step 302 a transient bias value is determined from the transient bias map.

In accordance with an embodiment, the transient bias map is generated as a function of one or more engine parameters. The one or more engine parameters may be measured and/or calculated. For example, a given engine parameter may be obtained from one or more sensors configured to measure the given engine parameter. The given engine parameter may be continuously measured, e.g. in real time, and/or recorded regularly in accordance with any suitable time interval or irregularly. A given engine parameter may be calculated based on one or measurements obtained from the one or more sensors and/or based on engine parameters provided by an engine and/or aircraft computer. For example, speed and/or torque may be measured, and power may be calculated based on speed and torque. The one or more engine parameters may be corrected engine parameters. The one or more engine parameters may be corrected based on temperature and/or pressure of the engine relative to the standard sea level temperature and/or pressure. For example, corrected torque (QN) may be determined from torque (Q) as follows: $QN=Q/\sqrt{P/P_{standard}}$, where P is the engine's pressure and $P_{standard}$ is the standard sea level pressure. By way of another example, corrected power (SHPN) may be determined from power (SHP) as follows: $SHPN=SHP/\sqrt{T/T_{standard}}$, where T is the engine's temperature and $T_{standard}$ is the standard sea level temperature. By way of another example, corrected gas generator speed (NGN) may be computed from the gas generator speed (NG) as follows: $NGN=NG/\sqrt{T/T_{standard}}$. In some embodiments, the transient bias map is generated as a function of one or more of corrected power, corrected speed and corrected torque.

In accordance with an embodiment, the transient bias map used at step 302 varies as a function of one or more of engine rotational speed, power and torque. For example, the transient bias map may vary as a function of one or more of NGN, SHPN, and QN. The transient bias value may be obtained from a transient bias map based on the current engine rotational speed (e.g., NG or NGN), current power (e.g., SHP or SHPN), and/or torque (e.g., Q or QN).

At step 304, a steady-state value is determined from the steady-state schedule. In accordance with an embodiment, the steady-state schedule is generated as a function of the one or more engine parameters (measured and/or calculated) and one or more ambient conditions. The ambient conditions may comprise one or more of altitude, atmospheric pressure, atmospheric temperature, and atmospheric humidity. For example, the steady-state schedule may be generated as a function of one or more of corrected power, corrected speed, and corrected torque and one or more of altitude, pressure, and any other suitable ambient condition(s).

In accordance with an embodiment, the steady-state schedule used at step 304 varies as a function of engine rotational speed. For example, the steady-state schedule may vary as a function of NGN. The steady-state value may be obtained from a steady-state schedule based on the current engine rotational speed (e.g., NG or NGN). It should be appreciated that a map or schedule may refer to a curve, a look-up table, a function, an algorithm, a polynomial equation or any other suitable other logic. At step 306, the transient bias value is added to the steady-state value to determine the variable geometry mechanism request.

Referring to FIG. 3B, the step 208 of FIG. 2 is illustrated in accordance with a second embodiment. At step, 312, the transient bias map is added to the steady-state schedule to generate a modified schedule. At step 314, the variable geometry mechanism request is determined from the modified schedule. For example, the modified schedule may vary as a function of engine rotational speed (e.g., NG or NGN). Accordingly, the variable geometry mechanism request may be obtained from the modified schedule based on the current engine rotational speed (e.g., NG or NGN).

Figure 4:
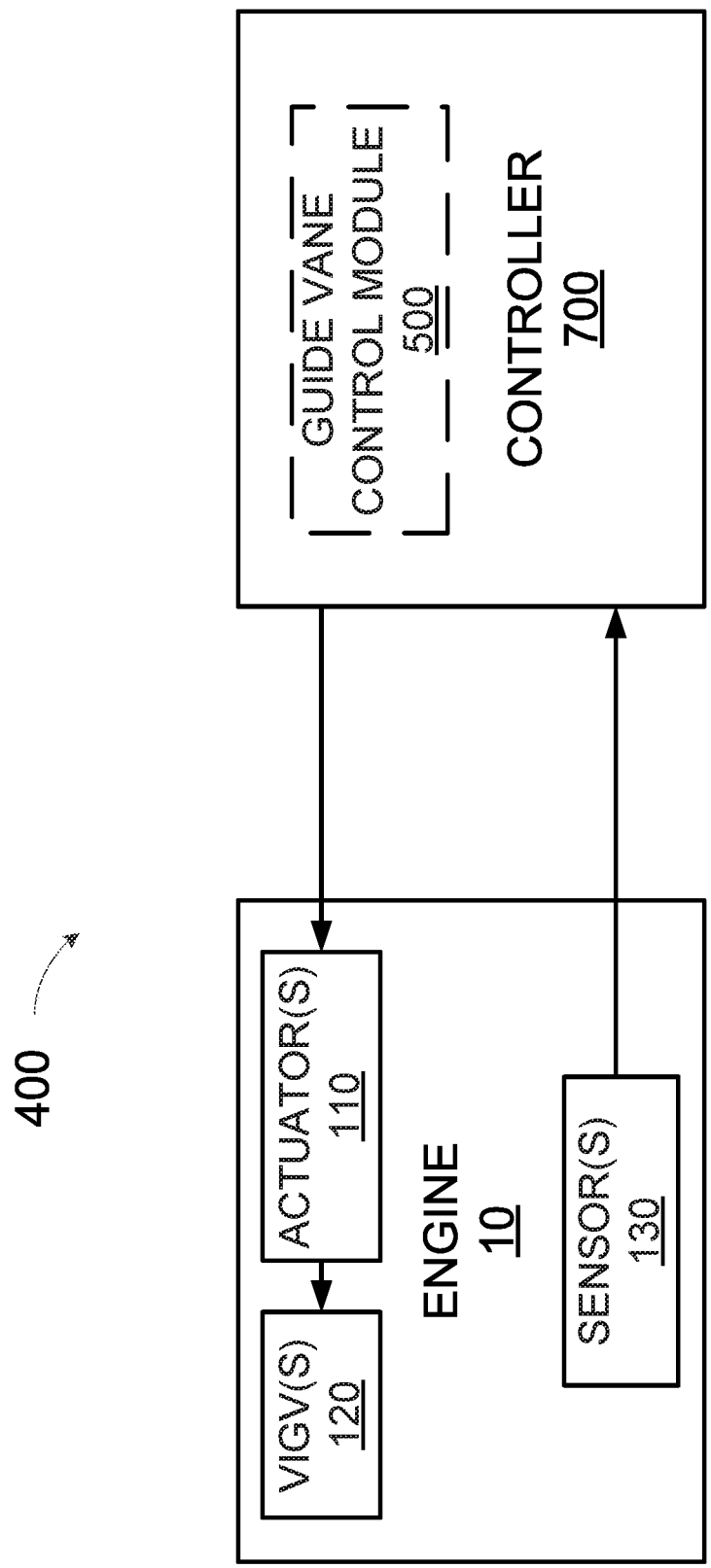
FIG. 4 is a block diagram of a system for adjusting a variable geometry mechanism, in accordance with an embodiment.

Referring to FIG. 4, a system 400 for adjusting a variable geometry mechanism of the engine 10, particularly variable inlet guide vanes (VIGVs) 120, is illustrated. While the system 400 is described herein with reference to the engine 10 and VIGVs 120, this is for example purposes. The system 400 may be applied to any other suitable engine and/or other suitable types of variable geometry mechanisms. The system 400 illustratively comprises a controller 700, which is coupled to the engine 10. The controller 700 may send control signals to one or more actuators 110 of the engine 10, which are configured to adjust the position of the VIGVs 120. The controller 700 may comprises a guide vane control module 500 for outputting a position control signal to the actuator(s) 110. The engine 10 may comprise one or more sensors 130 for measuring and providing one or more engine parameters to the controller 700.

Figure 5:
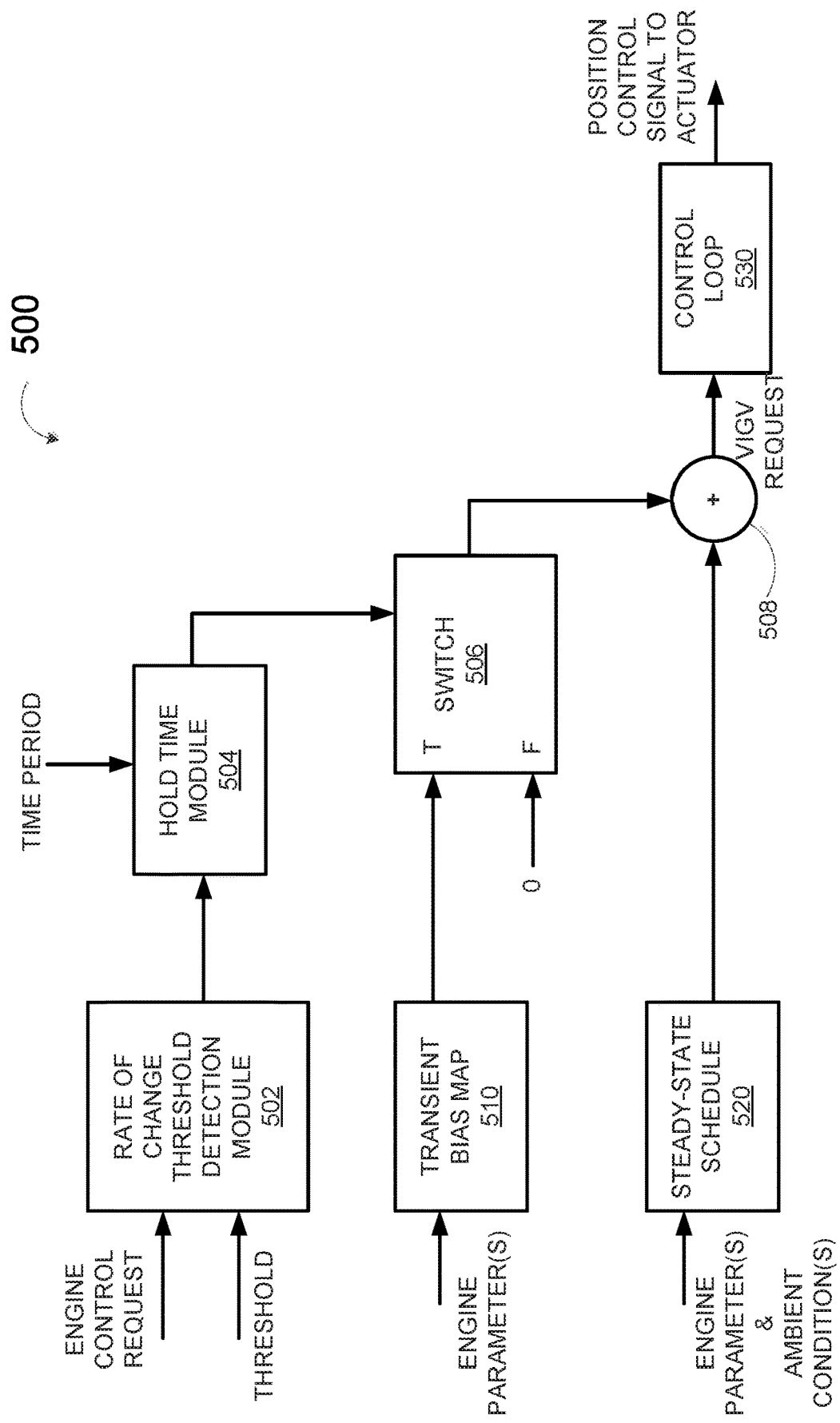
FIG. 5 is a block diagram of an example guide vane control module of the system of FIG. 4, in accordance with an embodiment.

Referring to FIG. 5, the guide vane control module 500 comprises a rate of change threshold detection module 502 that receives the engine control request (e.g., power control request or torque control request) and the threshold discussed herein above with reference to FIG. 2. The rate of change threshold detection module 502 determines the rate of change of the engine control request and compares the rate of change to the threshold. When the rate of change is beyond the threshold, an indicator to that effect is set and output by the rate of change threshold detection module 502. For example, the indicator may be set to a logical 1, to 'TRUE', or the like. A hold time module 504 receives the indicator and the time period for which the transient bias map is to be applied to the steady-state schedule. The hold time module 504 outputs the indicator for the duration of the time period. A switch 506 receives the indicator from the hold time module 504. When the indicator is TRUE (or a logical 1), the switch 506 applies the transient bias map 510 to the steady-state schedule 520 via the summing junction 508. The transient bias map 510 may be applied to the steady-state schedule 520 as described elsewhere in this document. When the indicator is FALSE (or a logical 0), the switch applies a zero (0) at the summing junction 508, and the transient bias map 510 is not applied to the steady-state schedule 520. In this example, the transient bias map 510 is generated based on the one or more engine parameters and the steady-state schedule 520 is generated based on the one or more engine parameters and the one or more ambient conditions. The summing junction 508 outputs the variable inlet guide vane request to a control loop 530, which may be any suitable control loop used to control the position of variable inlet guide vanes. Based on the variable inlet guide vane request, the control loop 530 outputs the position control signal to the actuator(s) 110 which in turn adjust the position of the VIGVs 120 accordingly.

Figure 6:
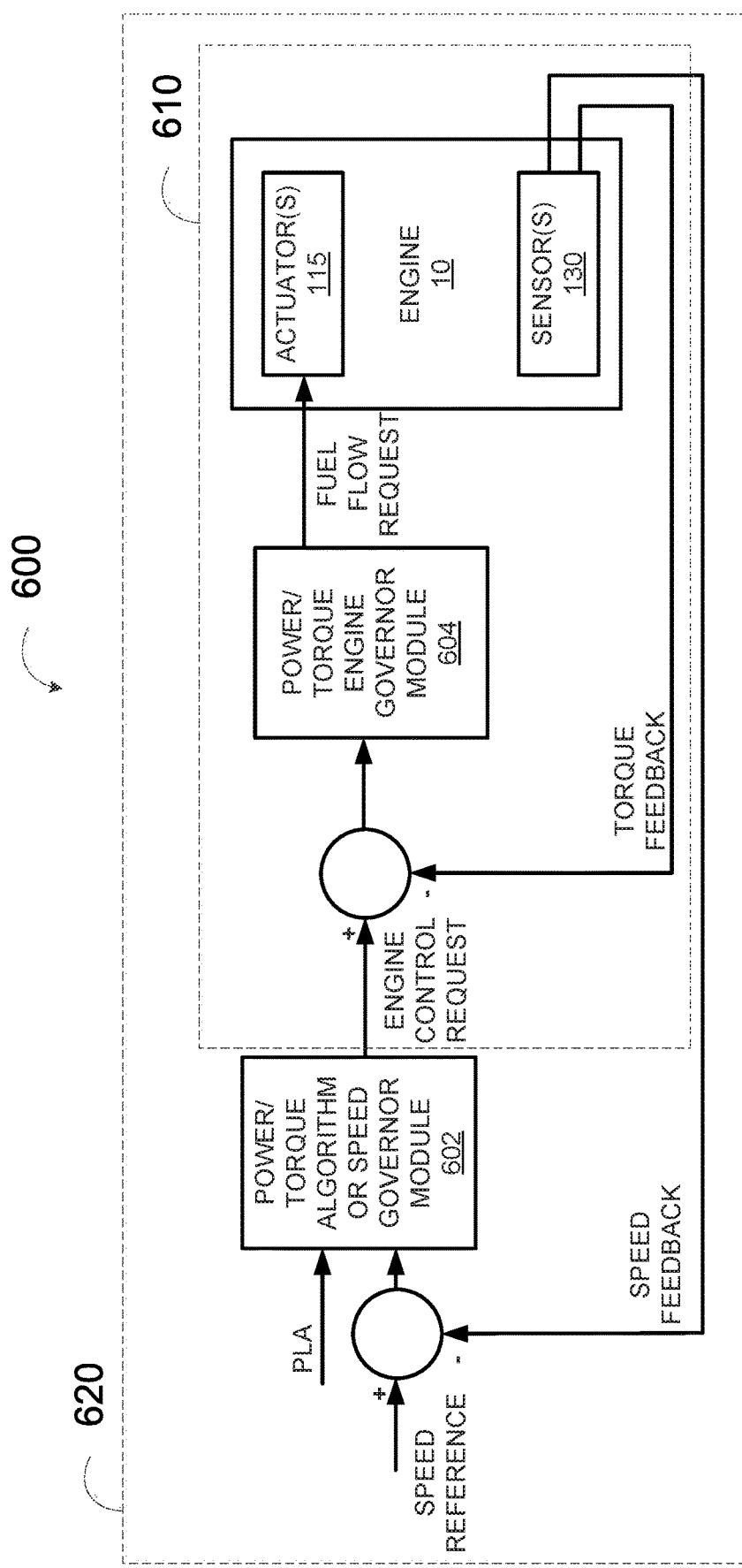
FIG. 6 is a block diagram of engine governing system, in accordance with an embodiment.

Referring to FIG. 6, an engine governing system 600 is illustrated. The engine governing system 600 may be used to determine and provide the engine control request (e.g., power control requests or torque control requests). A module 602 receives the power lever position (e.g., power lever angle (PLA)) from the power lever or a difference between a speed reference and a speed feedback. The speed reference may be received from an engine or aircraft computer. The speed reference is a target speed for the engine 10. The speed feedback is a measured speed of the engine received from the sensor(s) 130. The module 602 may be a power/torque algorithm module or a speed governor module depending on practical implementations. The power/torque algorithm module implements a computer-based algorithm that determines the engine control request based on the received inputs. For example, the module 602 determines the engine control request based on the power lever position (e.g., PLA) or on the difference between the speed reference and the speed feedback. The engine control request may be determined based on the position of the power lever for turboprop engines. The engine control request may be determined based on a difference between the target speed and the measured speed for turboshaft engines. The engine control request may be a torque control request, and a difference between the torque control request and a torque feedback provided by the sensor(s) 130 may then be determined. The power/torque engine governor module 604 determines a fuel flow request based on the difference between the torque control request and the torque feedback. The fuel flow request is provided to the engine 10 and one or more actuator(s) 115 adjust the fuel flow to the engine 10 accordingly.

When the engine 10 is a turboprop or a turboshaft engine, the engine control request may be provided by an outer control loop 620 to an inner control loop 610. Accordingly, the engine control request received at the rate of change threshold detection module 502 (FIG. 5) may be from the outer control loop 620 of the engine governing system 600 (FIG. 6). For a turboprop engine, the engine control request may be generated by a thrust setting algorithm via cockpit commanded PLA. In accordance with an embodiment, the thrust setting algorithm determines the engine control request (e.g., a power control request) as a function of one or more of engine rating, pilot input (e.g., PLA position, bleed selection, etc.), failure modes and ambient conditions. For turboshaft engines, the engine control request may be generated by a closed-loop speed governor used to maintain rotor speed. The engine control request may be determined from a proportional-plus-integral control loop based on rotor speed error (i.e., speed target minus speed feedback) or from a model-based rotor speed controller. Both inner and outer control loops 610, 620 may be model-based control, multivariable control, or have a legacy proportional-plus-integral structure with various engine limiters.

In some embodiments, monitoring the engine control request comprises receiving a position of the power lever obtained therefrom, where the position of the power lever is indicative of the desired output power for the engine 10. For example, one or more sensors may measure the engine control request from the power lever. Accordingly, a direct rate of change of the power lever position may be used as the rate of change of the engine control request.

In some embodiments, a thrust lever having a thrust lever position (e.g., thrust lever angle (TLA)) may be used in addition or alternatively to the power lever as described herein. For instance, the PLA may be used for turboprop engines and the TLA may be used for turbofan engines.

In some embodiments, for turboshaft engines, the outer control loop 620 may include a collective anticipation algorithm that generates a steady-state power level as a feedforward to the rotor speed governor 602. The rate of change of the steady-state power level may be used as the engine control request for adjusting the VIGVs 120.

In some embodiments, transient logic may be used to adjust other actuators such as core guide vanes or handling bleeds.

Figure 7:
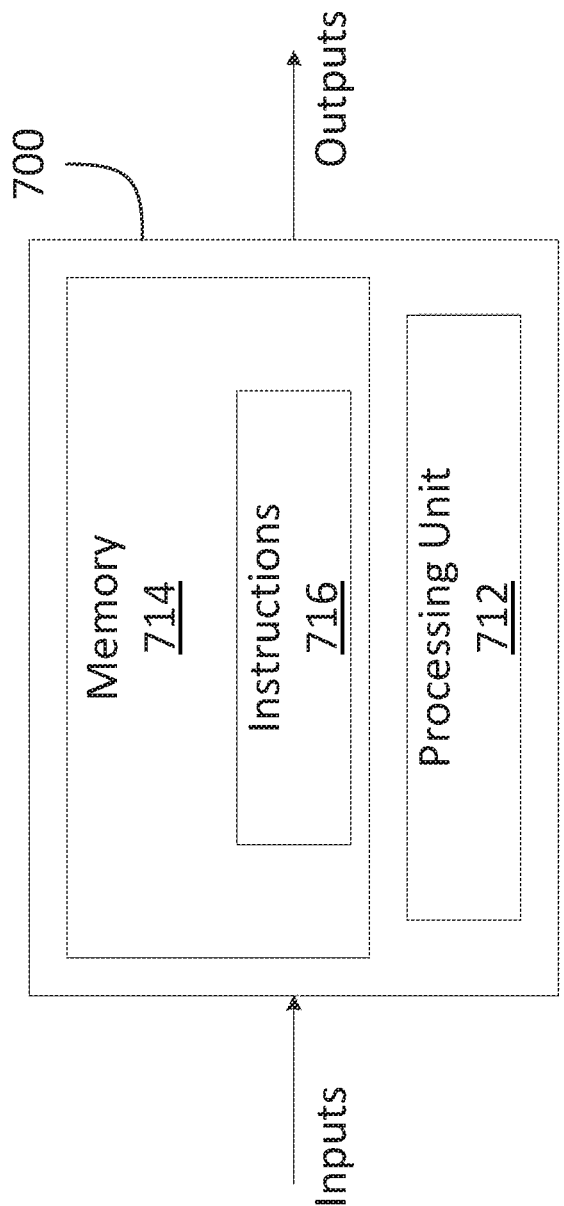
FIG. 7 is a block diagram of an example computing system for implementing the method of FIG. 2, in accordance with an embodiment.

With reference to FIG. 7, the method 200 may be implemented using the controller 700 implemented as a computing device comprising a processing unit 712 and a memory 714 which has stored therein computer-executable instructions 716. The processing unit 712 may comprise any suitable devices configured to implement the system such that instructions 716, when executed by the computing device 700 or other programmable apparatus, may cause the functions/acts/steps of the method 200 as described herein to be executed. The processing unit 712 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 714 may comprise any suitable known or other machine-readable storage medium. The memory 714 may comprise non-transitory computer readable storage medium, for example, but not limited to, an electronic, magnetic, optical, electromagnetic, infrared, or semiconductor system, apparatus, or device, or any suitable combination of the foregoing. The memory 714 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 714 may comprise any storage means (e.g., devices) suitable for retrievably storing machine-readable instructions 716 executable by processing unit 712. In some embodiments, the computing device 700 can be implemented as part of a full-authority digital engine controls (FADEC) or other similar device, including electronic engine control (EEC), engine control unit (ECU), and the like.

The methods and systems for adjusting a variable geometry mechanism described herein may be implemented in a high level procedural or object oriented programming or scripting language, or a combination thereof, to communicate with or assist in the operation of a computer system, for example the computing device 700. Alternatively, the methods and systems for adjusting a variable geometry mechanism may be implemented in assembly or machine language. The language may be a compiled or interpreted language. Program code for implementing the methods and systems for adjusting a variable geometry mechanism may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for adjusting a variable geometry mechanism may also be considered to be implemented by way of a non-transitory computer-readable storage medium having a computer program stored thereon. The computer program may comprise computer-readable instructions which cause a computer, or in some embodiments the processing unit 712 of the computing device 700, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems for adjusting a variable geometry mechanism may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

What is claimed is:

1. A system for adjusting a variable geometry mechanism of an engine, the system comprising:
   at least one processing unit; and
   a non-transitory computer-readable memory having stored thereon program instructions executable by the at least one processing unit for:
      monitoring an engine control request indicative of a desired output power for the engine;
      determining a rate of change of the engine control request;
      comparing the rate of change to a threshold;
      in response to determining that the rate of change is beyond the threshold, applying, for a predetermined period of time starting in response to determining that the rate of change is beyond the threshold, a transient bias map to a steady-state schedule to generate a variable geometry mechanism request indicative of a target position for the variable geometry mechanism; and causing a position of the variable geometry mechanism to be adjusted toward the target position according to the variable geometry mechanism request, the engine control request being one of a power control request indicative of a demand for the engine to produce output power at a request power level and a torque control request indicative of a demand for the engine to produce thrust at a requested thrust level.

2. The system of claim 1, wherein the program instructions are executable by the at least one processing unit for applying the transient bias map to the steady-state schedule to output the variable geometry mechanism request comprising:

determining a transient bias value from the transient bias map;

determining a steady-state value from the steady-state schedule; and adding the transient bias value to the steady-state value to determine the variable geometry mechanism request.

3. The system of claim 1, wherein the program instructions are executable by the at least one processing unit for applying the transient bias map to the steady-state schedule to output the variable geometry mechanism request comprising:

adding the transient bias map to the steady-state schedule to generate a modified schedule; and determining the variable geometry mechanism request from the modified schedule.

4. The system of claim 1, the program instructions are further executable by the at least one processing unit for generating the transient bias map as a function of corrected power of the engine.

5. The system of claim 1, the program instructions are further executable by the at least one processing unit for generating the transient bias map as a function of corrected speed of the engine.

6. The system of claim 1, wherein the program instructions are executable by the at least one processing unit for monitoring the engine control request comprising obtaining the engine control request determined based on a position of a power lever or a difference between a target speed of the engine and a measured speed of the engine.

7. The system of claim 1, wherein the program instructions are executable by the at least one processing unit for monitoring the engine control request comprising receiving a position of a power lever indicative of the desired output power for the engine.

* * * * *